United States Patent Office 3,423,288
Patented Jan. 21, 1969

3,423,288
PROCESS FOR PREPARING GENTIOBIOSE
Frank E. Halleck, Minnetonka, and Fred Smith, Wayzata, Minn., assignors to The Pillsbury Company, Minneapolis, Minn., a corporation of Delaware
No Drawing. Continuation-in-part of application Ser. No. 319,093, Oct. 24, 1963. This application June 17, 1964, Ser. No. 375,956
U.S. Cl. 195—31    14 Claims
Int. Cl. C12d 13/02

ABSTRACT OF THE DISCLOSURE

Gentiobiose is produced by subjecting a polysaccharide gum to the action of beta 1, 3 glucanase to hydrolyze the polysaccharide to a mixture of glucose and gentiobiose.

---

This application is a continuation in part of an application of Frank E. Halleck et al., entitled Polysaccharides and Methods for Production Thereof, filed Feb. 17, 1965, bearing Ser. No. 433,437, which, in turn, is a divisional application of the prior application of Frank E. Halleck, entitled, Polysaccharides and Methods for Production Thereof, filed Oct. 24, 1963, being Ser. No. 319,093 and now Patent No. 3,301,848 which is a continuation-in-part of prior application, Ser. No. 235,904, filed Oct. 30, 1962, and now abandoned.

The present invention relates to a process for producing gentiobiose and particularly to an improved process for the enzymatic production of gentiobiose.

The commercial production of gentiobiose has in the past been carried out by the partial hydrolysis of gentianose with a .2% solution of sulfuric acid or with invertin. Gentianose has been obtained as a constituent of the dried rhizome and roots of *Gentiana luita*. The gentiobiose prepared in this manner is often contaminated with substantial amounts of other carbohydrates.

While synethetic chemical and enzymatic preparations for gentiobiose have been previously proposed, they have been relatively expensive or otherwise commercially unacceptable.

In view of these and other deficiencies of the prior art, it is one object of the present invention to provide an improved process for the enzymatic preparation of gentiobiose.

It is yet another object to the present invention to provide an improved process for the enzymatic production of gentiobiose wherein the end product is uncontaminated by other carbohydrates.

These and other more detailed and specific objects will be apparent from the following specification which sets forth by way of example a preferred form of practising the present invention.

In accordance with the present invention there is provided a process for preparing gentiobiose comprising the steps of:

(a) Providing a solid high molecular weight water-soluble linear polysaccharide having the characteristics of a thickening agent in water and composed of an average of at least about 120 D-glucopyranose units, at least a portion of said units being present in the first form:

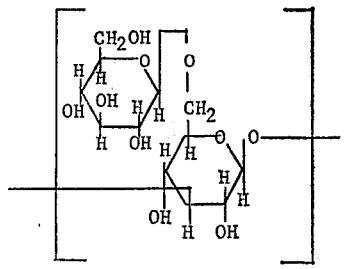

the remainder of said units being present in the second form:

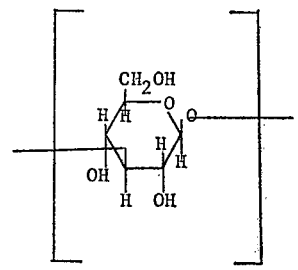

(b) Subjecting said polysaccharide to degradation by the action of beta 1,3 glucanase to provide a mixture of glucose and gentiobiose;

(c) Removing the glucose from the gentiobiose thus produced.

Advantageously employed herein are those polysaccharides which are composed of at least 200 glucopyranose units. Typical adaptable polysaccharides include those characterized as having the formula:

$$\left[ \begin{array}{cccc} X_1 & & & X_2 \\ | & & & | \\ \downarrow B & & & \downarrow B \\ 6 \phantom{X} B & B & B \phantom{X} 6 \phantom{X} B \\ G(1\to3) \, G(1\to3) \, G(1\to3) \, G(1\to3) \, G- \end{array} \right]_n$$

or $$\left[ \begin{array}{ccc} X_1 & & \\ | & & \\ \downarrow B & & \\ 6 \phantom{X} B & B & B \\ G(1\to3) \, G(1\to3) \, G(1\to3) \end{array} \right]_n$$

where G is characterized by the structure:

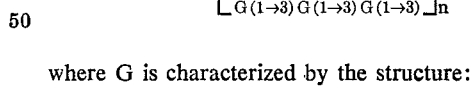

and $X_1$ and $X_2$ are glucopyranose groups having the structure:

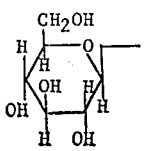

and $n$ is an integer having a value greater than 17 in the first occurring formula and 30 in the second.

In accordance with a preferred form of the present invention, there is provided as a starting material a polysaccharide formed from a main chain of glucose molecules linked beta 1 to 3 and including side chains of glucose molecules linked beta 1 to 6, such as polysaccharide gum containing glucose as the sole monomeric constituent and composed of the linear glucose molecule linked beta 1 to 3 to form the chain skeleton with appended glucose molecules linked beta 1 to 6 on every third glucose molecule in the chain as set forth below:

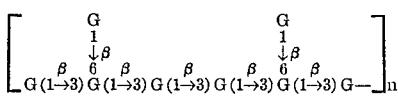

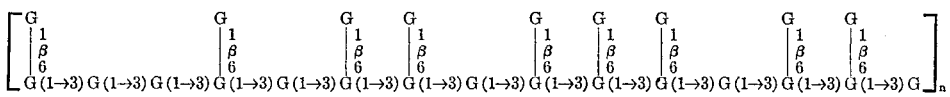

Where the letter G refers to glucopyranose and linkages of either beta 1,6 or beta 1,3 are as indicated, and $n$ is approximately 15 to 19 in the first compound and about 6 in the second.

The polysaccharide gum is subjected to the action of any water soluble beta 1,3 glucanase to produce a mixture of D-glucose and gentiobiose. Following the action of the glucanase, the gentiobiose is separated from the D-glucose remaining in the mixture.

Specifically, this polysacchardide gum is hydrolyzed to form D-glucose and gentiobiose through enzymatic hydrolysis with a beta 1-3 D-glucanase of the type derived from the organism Basidiomycete No. 806 of the collection maintained by the Microbiology Laboratory, Quartermaster Research and Engineering Center, Natick, Mass. It was found that the enzyme operates only from the non-reducing end of the molecule and selectively cleaves beta 1,3 bonds only so that following complete hydrolysis by this enzyme the gun breaks down into two fractions, one of which is D-glucose and the other of which is gentiobiose. During the course of this reaction, it has been found that the mole ratio of the resulting gentiobiose to D-glucose remains constant with respect to time.

In accordance with the present invention, the polysaccharide gum is obtained as described in the above-mentioned application. In summary, the process involves inoculating an aqueous solution containing at least one carbohydrate selected from sucrose, D-xylose, D-mannose, D-glucose, L-arabinose, D-galactose, fructose, maltose, melezitose, raffinose, methyl beta-maltoside, aesculin, cellobiose, trehalose, L-rhamnose, glycerol, cellulose and xylan, with an organism such as *Sclerotium glucanicum* n.sp. (NRRL 3006) or of other members of the genus Sclerotium or of the genera Corticium, Sclerotinia, or Stromatinia as set forth in the above-mentioned application. Depending upon the organism employed, the ratio of glucose to gentiobiose will vary greatly. For example, one organism may produce a compound having a ratio of 5 moles of glucose for each 3 moles gentiobiose while another may produce 3 moles of glucose for each 4 moles of gentiobiose or all gentiobiose. The organisms enumerated above will produce compounds having a ratio of 3 moles of glucose for each 2 moles of gentiobiose or 2 moles of glucose for each 1 mole of gentiobiose. Fermentation is carried out at a temperature between approximately 20° and 37° C. The gum produced in this manner is separated from the culture medium and purified in any known manner. In a typical recovery procedure, the pure gum is separated from the mycelium by diluation with two parts of fermentation liquor to one part of water followed by filtration or other suitable separating process. The polysaccharide is then separated from the water-soluble ingredients by percipitation with water-miscible organic solvent such as methyl, ethyl, propyl or isopropyl alcohol or acetone. The percipitated polysaccharide can then be separated from the liquid by filtration. The purified gum produced in the above manner can be dried and stored before use or redissolved or placed in solution for further treatment.

The enzyme beta D 1-3 glucanase is prepared in the following manner: A culture of Basidiomycete sp. Q.M. 806 is grown for a period of 4 to 14 days and at a temperature of 28° C. in a medium having the following composition:

| | |
|---|---|
| Glucose | grams 10 |
| Proteose peptone | do 1 |
| $KH_2PO_4$ | do 2 |
| $(NH_4)_2SO$ | do 1.4 |
| Urea | do 0.3 |
| $MgSO_4 \cdot 7H_2O$ | do 0.3 |
| $CaCl_2$ | do 0.3 |
| Yeast extract | do 0.1 |
| Water | liter 1 | pH 5.5.

The crude culture filtrate is centrifuged, concentrated, filtered, dialyzed and reconcentrated in vacuo to the volume prior to dialysis. The resulting solution will contain about 50–400 units of activity per milliliter as assayed and measured in a manner described by Nelson et al, in Can J. Chem. vol. 41, 1671 (1962). Many of the samples exhibited about 240 units of activity per milliliter.

The enzyme obtained in this manner is then employed to hydrolyze the gum in the following way: A relatively small volume of the enzyme solution, as for example about 5 ml., is added to a solution of the polysaccharide gum buffered with acetate buffer to a pH of from about 3 to 7 and preferably between 4 and 5 and at a temperature of about 30° C. to 70° C. Under laboratory procedures, hydrolysis is allowed to proceed at 50° C. for about 4 or 5 hours. The reaction is stopped by heat treatment at a temperature sufficient to denature the enzyme. It is then centrifuged and the reducing sugar content is determined by suitable analytical method, for example as set forth by Nelson-Somogyi in J. Biol. Chem., 195, 19 (1952). Next, the glucose in the mixture is removed in suitable known manner as by chemical means, by ion exchange resins, by enzymatic treatment with glucose oxidase, or by fermentation which can be carried out with an organism such as yeast adapted to metabolize glucose selectively. A preferred yeast is commercially-available bakers' yeast. The yeast is used in a concentration of about 5 grams for each 50 ml. of solution. Fermentation is then allowed to proceed at a temperature of about 10° C. to 55° C. and preferably between 20 and 30° C. for a period of about 5 hours. During the fermentation process a predominant portion of the glucose in the solution is removed. The remaining glucose is removed as explained hereinbelow by adsorption. The cells are then removed by centrifugation and the solution is concentrated in vacuo to a syrup.

The gentiobiose present in the solution is then purified by charcoal column chromatography in the following manner: The hydrolyzate is added to a column of coconut charcoal or some other suitable adsorbent and washed successively with water and varying concentrations of ethanol. The product prepared in this manner was found to be chromatographically free of glucose and other organic materials. Present supplies of commercially available gentiobiose were found to contain trace amounts of impurities up to 1% by weight of the product.

The concentration of the enzyme used for hydrolysis of the polysaccharide can be varied between wide extremes. Generally speaking, smaller amounts of the enzyme will merely require longer digestion times. The upper limit of enzyme concentration will be dictated largely by economic considerations. Generally speaking, the concentration of 1200 units of activity for each 5 grams of polysaccharide has proved satisfactory. The term "standard units of activity" as used herein refers to the units of activity as defined by Nelson et al. supra. It is preferred to indicate the concentration of the enzyme by units of activity rather than by a weight basis since the action of the enzyme can easily be rendered ineffective by denaturation due to drying heat or other factors. The gentiobiose is then recrystallized from an appropriate solvent such as ethanol, methanol, or glacial acetic acid. Upon exposure to air the hygroscopicity of gentiobiose causes it to absorb sufficient moisture to form a syrup. It is, therefore, frequently desirable to add 2 moles of methanol, 1 mole of acetic acid, or ½ mole of ethanol or other suitable material for each mole of gentiboise to provide a crystalline product.

The invention will be better understood by reference to the following examples:

Example I

To prepare beta D 1–3 glucanase, Basidiomycete sp. QM 806 is grown in the above-described medium at a temperature of 28° C. for a period of 4 days. One liter of the crude culture filtrate is centrifuged and concentrated 50 fold in vacuo in a bath having a temperature of 30° C. It is then filtered through a Millipore® filter, dialyzed and reconcentrated to the volume prior to dialysis. The solution will contain about 240 units of activity per milliliter as assayed and measured in a manner described by Nelson et al. supra.

A portion of the enzyme solution (5 ml.) is added to 5 grams of the above-described polysaccharide gum having a mole ratio of 2 glucose to 1 gentiobiose and dispersed in 0.05 M acetate buffer (1.0 l.) solution having a pH of 4.8. The hydrolysis is allowed to proceed at 50° C., samples being removed after 1, 2, 4, 6, 10 and 21 hours. Each of the samples is heated in a steam bath for 2 minutes to deactivate the enzyme, centrifuged and the reducing sugar content determined by the method of Nelson-Somogyi, J. Biol. Chem., 195, 19 (1952). A constant reducing value will be obtained after 4 hours.

The hydrolysis is terminated after 21 hours by autoclaving for 2 minutes at 110° C. A small amount of inorganic material is removed by centrifugation after which the solution was neutralized by the addition of 10 percent sodium hydroxide and concentrated in vacuo to approximately 50 ml. The hydrolyzate is then treated with 5 gm. of washed bakers' yeast for about 4 hours. The disappearance of glucose is followed by thin-layer chromatography on Kieselguhr G according to Stahl in J. Chromatography 5, 351 (1961). The cells are removed by centrifugation, the solution neutralized and concentrated. The hydrolyzate is added to a column of coconut charcoal (2.5 cm. x 18 cm.) and washed succesively with 7 liters of water, 4 liters of 5 percent ethanol, and finally with 2 liters of 10 percent ethanol, the eluate being collected in 500 ml. fractions. The fractions are concentrated in vacuo and the contents analyzed by thin-layer and paper chromatography. The 10% aqueous ethanol eluate containing the gentiobiose will be obtained as a chromatographically pure syrup by evaporation of the solvent in vacuo. The syrup is then dissolved in refluxing absolute methanol and the product crystallized by cooling. The product exhibited the following characteristics: M.P. 84° (dec.), $[\alpha]_D^{23.5} + 13.0°$ at a concentration of 3.3 gm. in 100 ml. water (after 15 min.) changing in 24 hours to +8.4° (equilibrium value).

Example II

A small portion of the product obtained in Example I is acetylated with acetic anhydride and anhydrous sodium acetate yielded beta-gentiobiose octaacetate, M.P. and mixed M.P. 191° C. after recrystallization from methanol.

Example III

Beta D 1–3 glucanase is prepared by growing Basidiomycete sp. QM 806 in the above-described medium at a temperature of 20° C. for a period of 14 days. About one liter of the crude culture filtrate is filtered and concentrated 50 fold in vacuo at about 50° C. (bath temperature). It is then filtered through a Millipore® filter, dialyzed and reconcentrated to the volume prior to dialysis. The solution will contain 200 units of activity per milliliter as assayed and measured in a manner described in Example I.

A 5 ml. portion of the enzyme solution is added to 5 grams of the above-described polysaccharide gum having a mole ratio of 3 glucose to 2 gentiobiose and dispersed in 0.05 M acetate buffer solution having a pH of 4.0. The hydrolysis is allowed to proceed at 50° C. A sample was removed after 4 hours. The sample is heated in a steam bath for 3 minutes to deactivate the enzyme. It is then centrifuged and the reducing sugar content determined by the method of Nelson-Somogyi, supra.

The hydrolysis is terminated after 21 hours by autoclaving for 3 minutes at 120° C. Inorganic material is removed by centrifugation after which the solution is neutralized by the addition of 10 percent sodium hydroxide and concentrated in vacuo to approximately 50 ml. The hydrolyzate is then treated with 2 gm. of washed bakers' yeast for about 10 hours. The disappearance of glucose is followed by thin-layer chromatography on Kieselguhr G according to Stahl, supra. The cells are removed by centrifugation, and the solution neutralized and concentrated. The hydrolyzate is added to a column of coconut charcoal (2.5 cm. x 18 cm.) and washed successively with water, 5 percent ethanol, and finally with 10 percent ethanol, the eluate being collected in 500 ml. fractions. The fractions are concentrated in vacuo and the contents analyzed by thin-layer and paper chromatography. The 10% aqueous ethanol eluate contained the gentiobiose which is obtained as a chromatographically pure syrup by evaporation of the solvent in vacuo. The syrup is dissolved in refluxing absolute methanol and the product crystallized by cooling. The product exhibited the following characteristics: M.P. 84° (dec.), $[\alpha]_D^{23.5} + 13.0°$ in water (after 15 min.) changing in 24 hours to +8.4° (equilibrium value).

While the invention is described in connection with a

We claim:
1. The process for preparing gentiobiose comprising the steps of:
(a) providing a solid high molecular weight water-soluble linear polysaccharide having the characteristics of a thickening agent in water and composed of an average of at least about 120 D-glucopyranose units, at least a portion of said units being present in the first form:

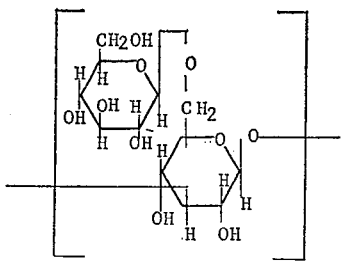

the remainder of said units being present in the second form:

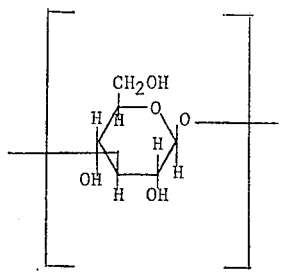

(b) subjecting said polysaccharide to degradation by the action of beta 1,3 glucanase to provide a mixture of glucose and gentiobiose,
(c) removing the glucose from the gentiobiose thus produced.

2. The process according to claim 1 wherein the pH is maintained from about 3 to about 7 and the temperature from 20 to 50° C. during the treatment of the said polysaccharide wih said enzyme.

3. The process according to claim 1 wherein the concentration of the said enzyme is maintained at about 1200 standard units for each 5 grams of polysaccharide in the treatment of said polysaccharide with said enzyme.

4. The process according to claim 1 wherein the glucose is removed from the gentiobiose solution by introducing an organism adapted to metabolize monosaccharides.

5. The process according to claim 4 wherein the glucose remaining after fermentation by said organism is removed by adsorption upon a carbonaceous adsorbing medium adapted to adsorb glucose selectively.

6. The process according to claim 5 wherein the adsorbing medium is comprised of charcoal.

7. The process for producing gentiobiose comprising in combination providing a substantially water-soluble polysaccharide having the formula:

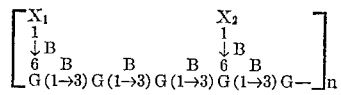

wherein G is characterized by the structure:

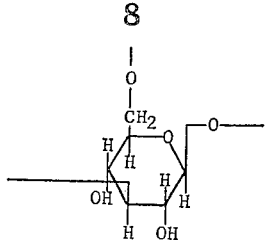

and $X_1$ and $X_2$ are glucopyranose groups having the structure:

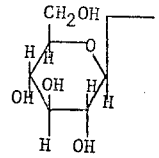

and $n$ is an integer having a value greater than 17; subjecting the polysaccharide to the action of an enzyme consisting essentially of beta 1–3 glucanase in a concentration of about 1200 standard units of said enzyme for each 5 grams of polysaccharide and at a temperature of about 30 to 50° C. until the said polysaccharide is hydrolyzed to form a mixture of glucose and gentiobiose and thereafter removing the glucose from the gentiobiose through selective hydrolysis of the glucose, removing noncolloidal materials from the solution by dialysis, concentrating the resulting solution of gentiobiose and recrystallizing the gentiobiose by the addition of a water-miscible organic solvent and thereafter removing the gentiobiose thus produced by filtration.

8. The process according to claim 7 wherein the pH is maintained on the order of from about 4 to 5 during the hydrolysis of said polysaccharide by said enzyme.

9. The process for producing gentiobiose comprising in combination providing a substantially water-soluble polysaccharide composed of an average of at least about 200 D-glucopyranose units with at least 60 of said units being present in the first form:

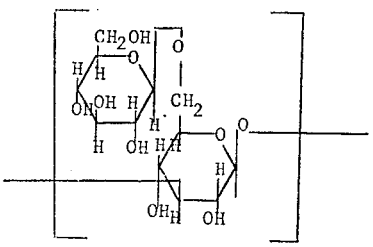

the remainder of said units being present in the second form:

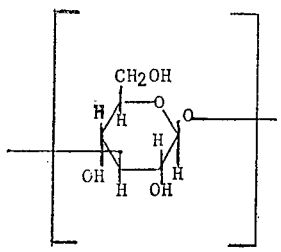

subjecting the said polysaccharide to the action of an enzyme consisting essentially of beta 1–3 glucanase in a concentration of about 1200 standard units of said enzyme for each 5 grams of polysaccharide and at a temperature of about 30 to 50° C. until the said polysaccharide is hydrolyzed to form a mixture of glucose and gentiobiose and thereafter removing the glucose from the gentiobiose through selective hydrolysis of the glucose, removing non-colloidal materials from the solution by dialysis, concentrating the resulting solution of gentiobiose and recrystallizing the gentiobiose by the addition of a water-miscible organic solvent and thereafter removing the gentiobiose thus produced by filtration.

10. The process for producing gentiobiose comprising in combination providing a polysaccharide having the formula:

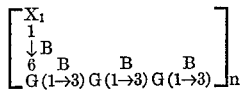

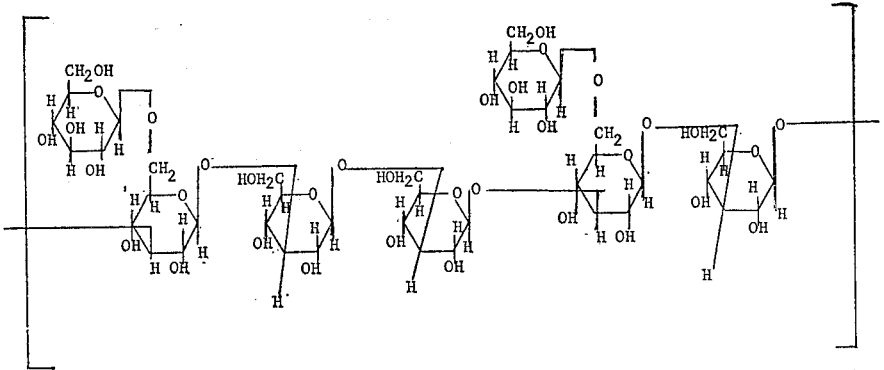

where G is characterized by the structure:

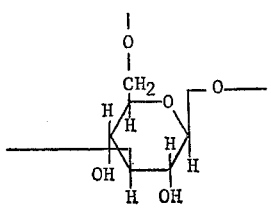

and $X_1$ and $X_2$ are glucopyranose groups having the srtucture:

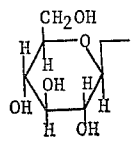

and $n$ is an integer having a value greater than 30; subjecting the said polysaccharide to the action of an enzyme comprising beta 1–3 glucanase in a concentration sufficient to maintain a sustained reaction with the polysaccharide at a temperature of about 30 to 50° C. until the said polysaccharide is hydrolyzed to form a mixture of glucose and gentiobiose, thereafter heating the solution to a temperature sufficient to denature said enzyme, next removing the glucose from the gentiobiose, removing other impurities from the solution, concentrating the resulting solution of gentiobiose and removing the gentiobiose from solution by the addition of a water-miscible organic solvent and thereafter isolating the gentiobiose thus produced from the solution.

11. The process for producing gentiobiose comprising in combination providing a polysaccharide composed of at least about 120 D-glucopyranose units and having the formula:

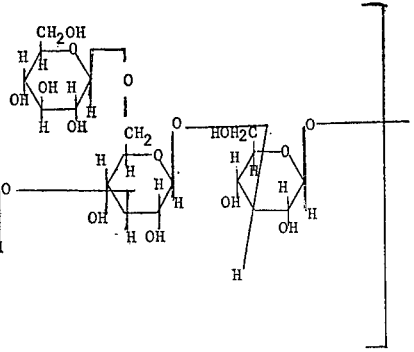

subjecting the said polysaccharide to the action of an enzyme comprising beta 1–3 glucanase in a concentration sufficient to maintain a sustained reaction with the polysaccharide at a temperature of about 30 to 50° C. until the said polysaccharide is hydrolyzed to form a mixture of glucose and gentiobiose, thereafter heating the solution to a temperature sufficient to denature said enzyme, next removing the glucose from the gentiobiose, removing other impurities from the solution, concentrating the resulting solution of gentiobiose and removing the gentiobiose from solution by the addition of water-miscible organic solvent and thereafter isolating the gentiobiose thus produced from the solution.

12. The process according to claim 9 wherein the pH is maintained on the order of from about 4 to 5 during the hydrolysis of said polysaccharide by said enzyme.

13. The process of claim 12 wherein the glucose is removed by fermentation with a yeast of the type adapted to metabolize glucose.

14. The process of claim 13 wherein the glucose is removed by fermentation with an enzyme adapted to oxidize glucose.

References Cited

Reese et al.: Can J. Microbiol vol. 5, pp. 173 to 183 (1959) 195–31.

ALVIN E. TANENHOLTZ, *Primary Examiner.*

U.S. Cl. X.R.

260—209; 195—66, 80